(No Model.)
H. MOORE.
SEWING MACHINE.
No. 554,392. Patented Feb. 11, 1896.
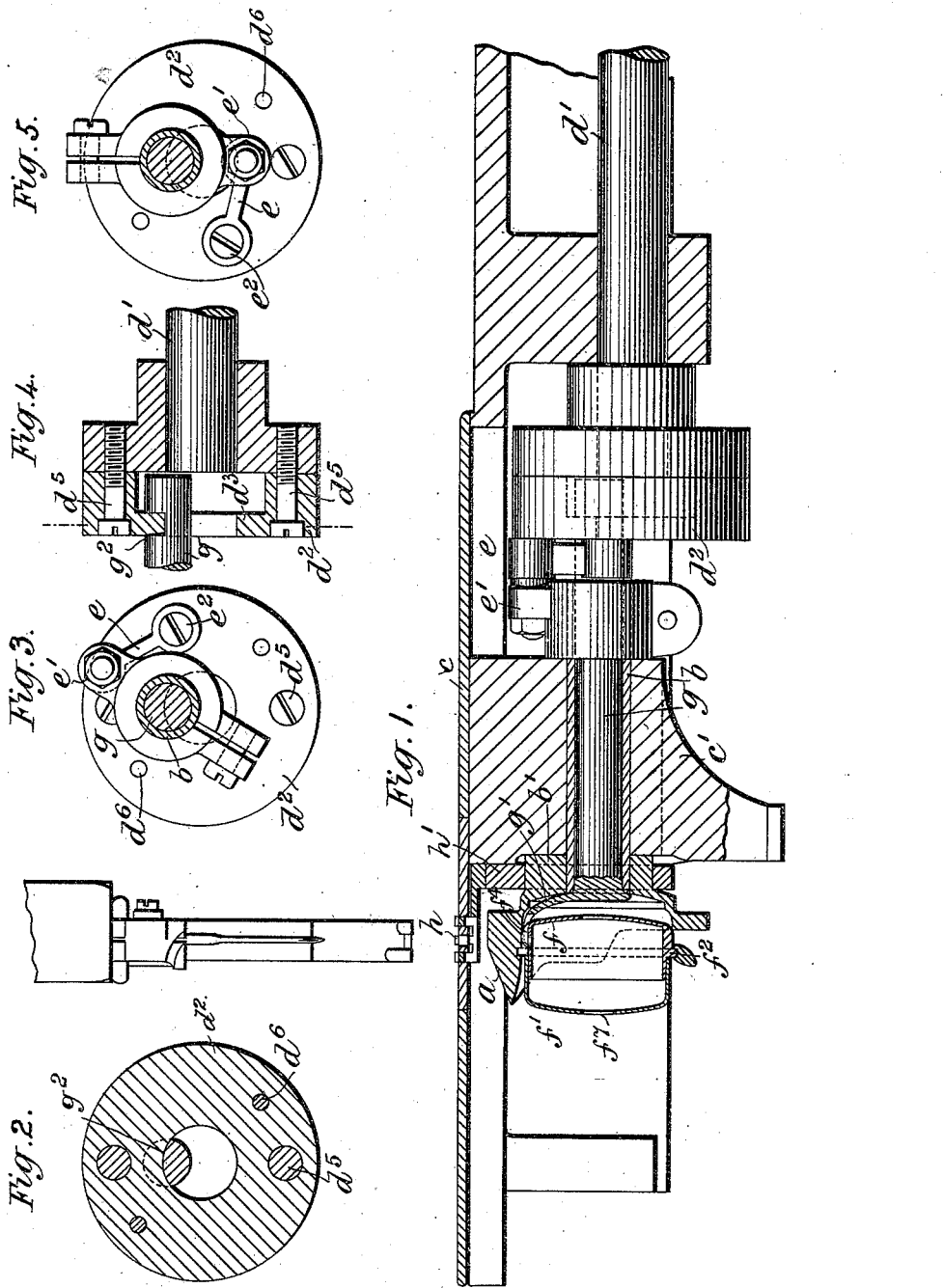
WITNESSES.
Albert Jones
John F. Gairns
INVENTOR.
Harvey Moore
By his Attorneys
Wheatley & Mackenzie

UNITED STATES PATENT OFFICE.

HARREY MOORE, OF WELLINGBOROUGH, ENGLAND.

SEWING-MACHINE.

SPECIFICATION forming part of Letters Patent No. 554,392, dated February 11, 1896.

Application filed January 6, 1894. Serial No. 496,021. (No model.)

*To all whom it may concern:*

Be it known that I, HARREY MOORE, a subject of the Queen of Great Britain and Ireland, residing at Wellingborough, in the county of Northampton, England, have invented certain new and useful Improvements in Sewing-Machines; and I do hereby declare the following to be a full, clear, and exact description of the invention, such as will enable others skilled in the art to which it appertains to make and use the same.

This invention relates to sewing-machines; and it consists in the novel construction and combination of the parts hereinafter fully described and claimed.

In the accompanying drawings, Figure 1 is a longitudinal section through the mechanism for actuating the shuttle. Fig. 2 is a cross-section through the disk $d^2$. Fig. 3 is a cross-section through the shaft $g$, showing the disk $d^2$. Fig. 4 is a longitudinal section through the disk $d^2$. Fig. 5 is a cross-section similar to Fig. 3, but showing the parts in a different position.

The rotary shuttle or hook $a$ is fixed on a hollow shaft $b$ mounted in a bearing $c'$ depending from the cloth-plate $c$. The hollow shaft $b$ is driven from a counter-shaft $d'$, itself driven from the main shaft. The counter-shaft $d'$ is parallel to the shaft $b$, but eccentric to it, and the shaft $b$ is driven by means of a link $e$ and arm $e'$ from a stud $e^2$ fixed to a disk $d^2$ mounted on the end of the counter-shaft $d'$. The eccentricity of the shaft $d'$ causes the shuttle or hook $a$ to be driven at a variable speed, so that when the hook is taking the thread from the needle the speed is slow.

The thread-case $f$ is maintained stationary in the shuttle or hook $a$ by means of the stop-shaft $g$, mounted in the hollow shaft $b$ and provided at its front end with a forked arm $g'$ projecting within the hook or shuttle and engaging with a projection $f^4$ on the back of the thread-case. The back end of the stop-shaft projects beyond the end of the hollow shaft $b$ into the disk $d^2$, which is made hollow, as shown in Fig. 4, and is provided at its front end with an inwardly-projecting flange $d^3$. The stop-shaft $g$ is notched at $g^2$ to receive the flange $d^3$, which on account of its eccentricity keeps the shaft $g$ stationary while it rotates itself. The disk $d^2$ is made in two parts secured together by screws $d^5$, so that the stop-shaft can be readily inserted in place from the front and to facilitate the removal of the hook or shuttle when required. Guide-pins $d^6$ fixed to one part of the disk $d^2$ and having projecting ends entering recesses in the other part insure the accurate position of the parts.

What I claim, and desire to secure by Letters Patent, is—

The combination, with the revoluble hook; of the stationary thread-case concentric therewith; the hollow shaft secured to the hook; the arm $e'$ secured to the said hollow shaft; the counter-shaft $d'$ arranged eccentric of the said hollow shaft; the disk $d^2$ formed of two parts secured side by side, one part being secured to the counter-shaft and the other part having the internal flange $d^3$, and a projecting pin; the link $e$ connecting the said pin with the arm $e'$; and the stationary stop-shaft $g$ inserted in the said hollow shaft and provided with a notch at its rear end engaging with the flange $d^3$, and a forwardly-projecting arm, at its front end, engaging with the said thread-case, substantially as set forth.

In testimony whereof I have affixed my signature in presence of two witnesses.

HARREY MOORE.

Witnesses:
 ALBERT JONES,
 THOMAS LAKE.